Sept. 17, 1968  G. C. NEWTON, JR  3,402,334
APPARATUS FOR SEQUENTIALLY ENERGIZING WINDINGS
Filed Dec. 8, 1965  3 Sheets-Sheet 1

Inventor
George C. Newton, Jr.
By his Attorney
Richard G. Wise

Sept. 17, 1968   G. C. NEWTON, JR   3,402,334
APPARATUS FOR SEQUENTIALLY ENERGIZING WINDINGS
Filed Dec. 2, 1965   3 Sheets-Sheet 2
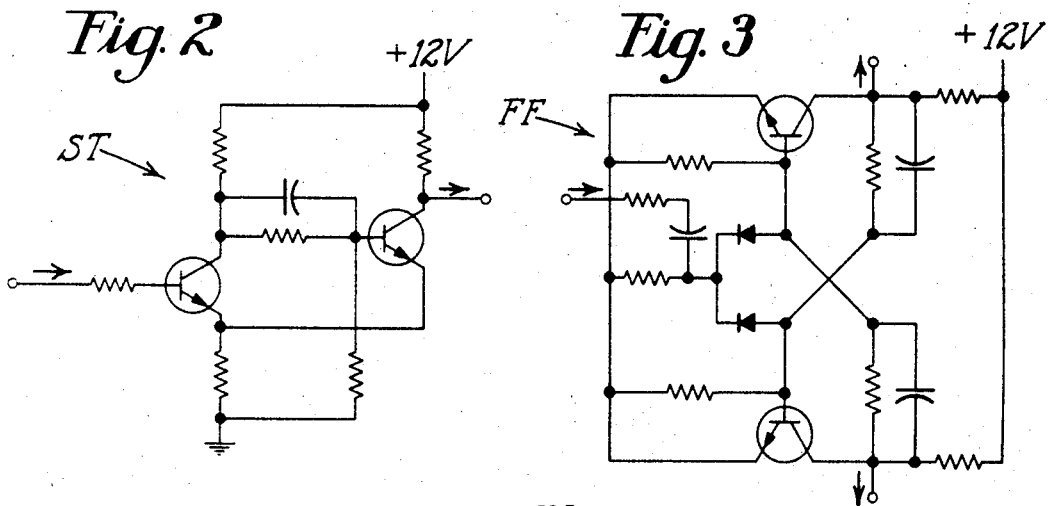
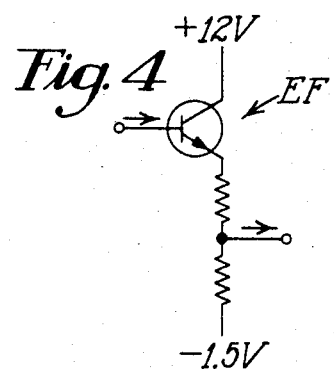
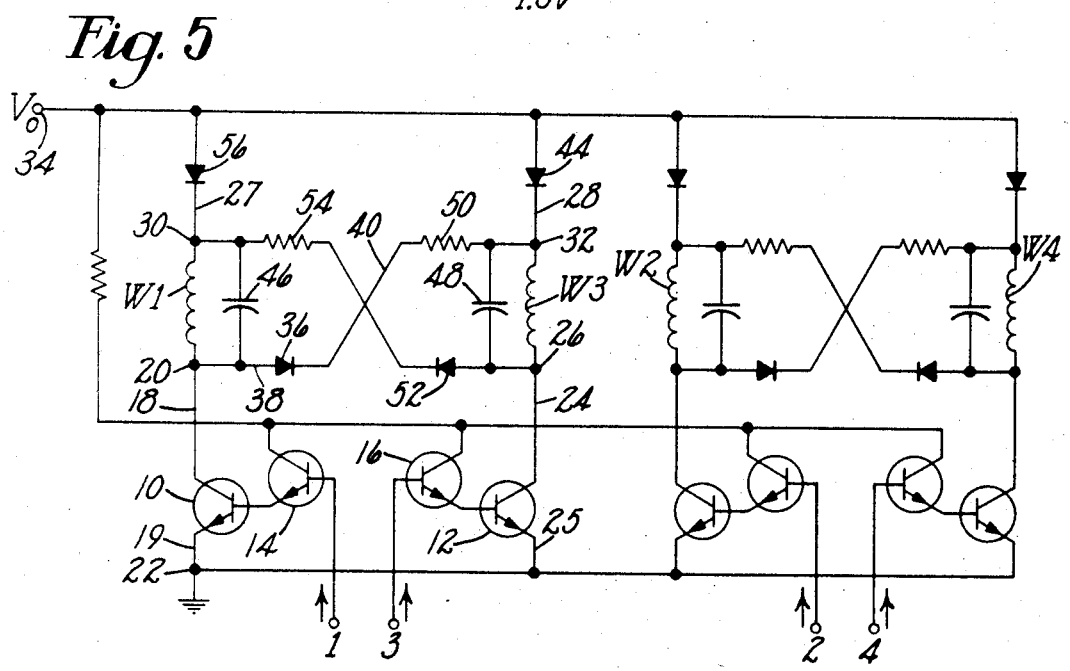

Sept. 17, 1968         G. C. NEWTON, JR         3,402,334
APPARATUS FOR SEQUENTIALLY ENERGIZING WINDINGS
Filed Dec. 8, 1965                              3 Sheets-Sheet 3

United States Patent Office 3,402,334
Patented Sept. 17, 1968

3,402,334
APPARATUS FOR SEQUENTIALLY ENERGIZING WINDINGS
George C. Newton, Jr., Lincoln, Mass., assignor to United Shoe Machinery Corporation, Boston, Mass., a corporation of New Jersey
Filed Dec. 8, 1965, Ser. No. 512,299
7 Claims. (Cl. 318—138)

This invention relates to control circuits for operating electric apparatus and more particularly it relates to a controller for supplying pulses of D.C. electric current sequentially and at high speed to a plurality of windings of electrically operated apparatus.

The invention is illustrated as embodied in apparatus for controlling the energization of stator windings in a stepping motor of the type illustrated in United States Letters Patent No. 3,169,201, Spring et al., and more particularly shown and described in United States application Ser. No. 409,001, filed Nov. 4, 1964, now Patent No. 3,331,974 in the name of Herbert W. Proctor, but it will be understood that the invention is not limited to use with such motors.

Prior to this invention the limits on the stepping rate of stepping motors of the illustrative type, which require the sequential energization of windings with direct current, have been set primarily by the driving circuit used. Because of the inductance of the windings, increasing the speed of operation has required the employment of higher voltages across the windings in order to produce the necessary speed of current change. For example, in a stepping motor designed for 12 volt operation and having a winding inductance of 0.06 henrys and having an operational winding current of about 2 amperes, operation at 1000 steps per second with 10% of the nominal "on-time" used to accomplish the current change, involves a rate of change of current of 10,000 amperes per second, requiring 600 volts across the winding.

Controllers for stepping motors conventionally have used higher-than-normal-voltage power supplies and series resistors in order to accomplish rapid current changes. In addition, conventional circuits frequently use Zener diodes, or diodes and series resistors, across the windings in order rapidly to reduce the current when the winding current is switched off. Thus, it is apparent that the conventional circuits are wasteful of power because so much is thrown away in the series resistors used to increase the rates of change of current. For the example mentioned above, approximately 2,400 watts of power would be wasted in unnecessary I²R losses. It is evident that the amount of such power waste in conventional circuits increases with increasing speed of operation. Thus, a major problem to be overcome in order to accomplish high speed operation is the avoidance of such power losses.

Accordingly, it is an object of the present invention to provide a controller for sequentially energizing a plurality of windings with direct current which controller incorporates a driving circuit designed to avoid excessive power loss.

Another object of the invention is provide a high speed controller for stepping motors and the like which incorporates a driving circuit designed to provide current pulses of suitably square wave form to the windings of stepping motors and the like without requiring a supply voltage of greatly excessive value with attendant power losses.

To this end and in accordance with a feature of the present invention, there is provided a controller having a drive circuit for sequentially energizing, from a source of D.C. voltage, windings of a direct current operated apparatus comprising a pair of windings, said controller comprising a pair of switch means, means for connecting each switch means in series with a winding and a source of voltage, means for simultaneously turning off one switch means and turning off the other means for connecting the induced transient voltage resulting from the turning-off of the switching means of one winding to the other winding to effect a rapid rise in current therein. As illustrated, such connecting means comprises diode means forming a current surge path from one winding to the other of said pair.

Other features and advantages of the invention will best be understood from the following description taken together with the accompanying drawings in which:

FIGS. 2, 3, 4 and 5 are detail circuit diagrams corresponding to the blocks of the diagram of FIG. 1;

Figure 6:
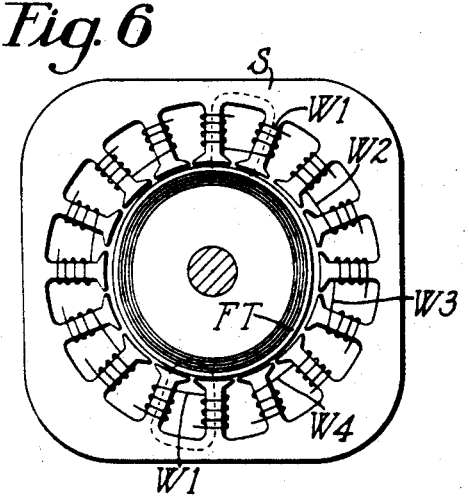
FIG. 6 is a transverse section illustrating the stator winding and flux paths of an illustrative stepping motor further described in the aforesaid application.
Figure 7:
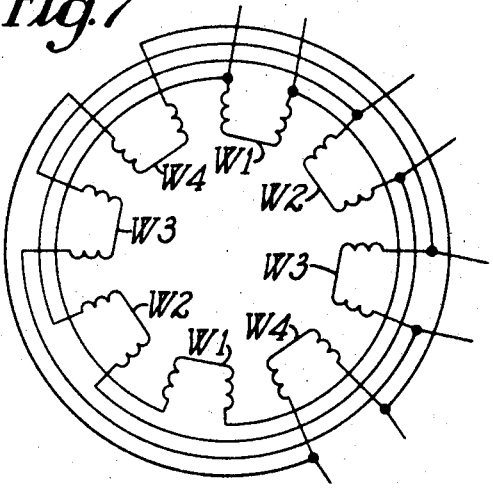
FIG. 7 is an electrical diagram of the windings shown in FIG. 6 together with means for connecting the windings to the controller circuit.

Referring to the figures, the invention is illustrated as embodied in a controller whose function is sequentially to energize windings W1, W2, W3 and W4 corresponding to the windings of the stepping motor shown in section in FIG. 6 which motor has a stator S and a flex tube FT in which a rotating radial deflection is to be generated. It will be noted from the connection diagram of FIG. 7 that each winding has two parts spaced 180° about the axis. The circuitry is conventional up to the drivers and comprises a Schmitt trigger ST (see also FIG. 2) feeding into a flip-flop circuit FF1 (see FIG. 3) which in turn supplies the two flip-flop circuits FF2 and FF3. The flip-flops FF2 and FF3 supply the driver circuits through emitter follower circuits (see FIG. 4) EF2, EF3, EF2 and EF3. The detail circuits for the trigger flip-flops and emitter followers are conventional so that there is no need to describe their individual operations. For the purpose of understanding their operation in the organization of the controller, assume that a pulse from a variable rate pulse source P (FIG. 1) to the input of the Schmitt trigger ST results in currents in windings W1 and W2. Then following the logic of FIG. 1, the second pulse in the forward direction results in currents in windings W2 and W3, etc. Thus, since there is always current in two windings, this type of circuit is sometimes referred to as producing a two-coil-on-two-coil-off mode of operation.

Figure 1:
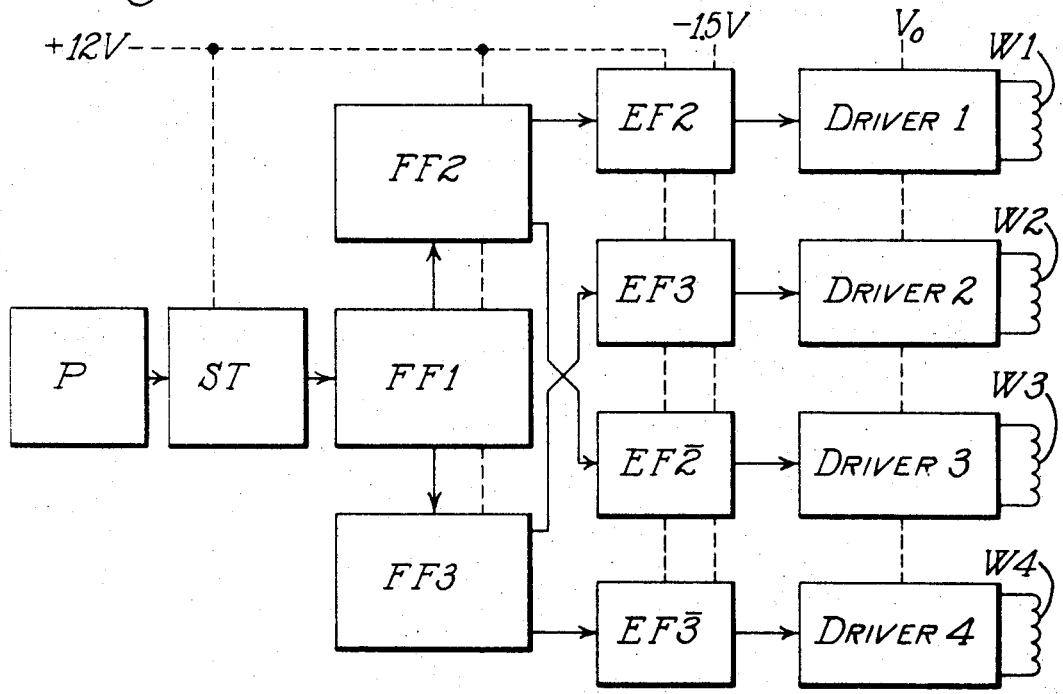
FIG. 1 is a functional block diagram of a controller embodying the present invention.
Figure 8:
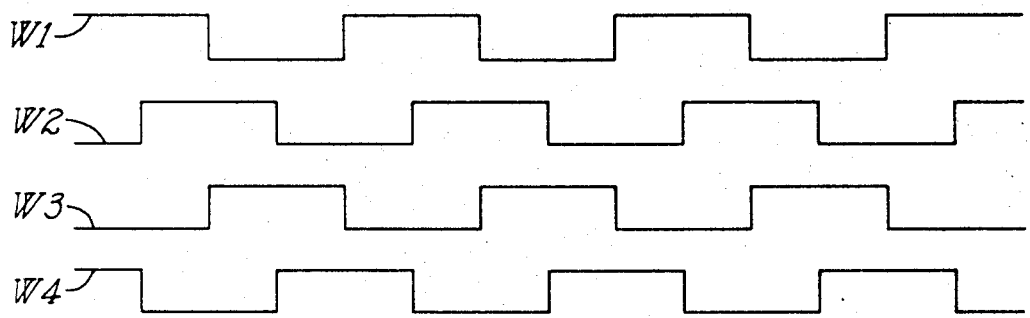
FIG. 8 shows a set of idealized wave forms illustrating the phasing of the pulses in the windings of FIGS. 6 and 7.

FIG. 5 shows the circuit for the drivers shown in FIG. 1 which switch the stepping motor windings. The circuit comprises two similar parts in each of which there is shown two windings, e.g., W1 and W3, in which windings current is caused to flow alternately. Accordingly, only one of these parts, that part comprising the windings W1 and W3, will be described in detail, it being understood that the operation of the other part is similar except for a time difference in the periods of alternation as indicated in FIG. 8.

The controller has first switching means and second switching means comprising respectively transistors 10 and 12 (FIG. 5) operable by an input from the emitter follower circuits of FIG. 1 through input driver transistors 14 and 16 respectively for varying the conductivity of the electric path through the transistors 10 and 12. Means comprising conductors 18 and 19 are provided for connecting the transistor 10 between one side 20 of winding W1, hereinafter referred to as the first winding, and one terminal 22, indicated as ground, of a source of direct current. Likewise, means comprising conductors 24 and 25 are provided for connecting one side 26 of winding W3, hereinafter referred to as the second winding, to said one terminal 22 of the D.C. source, and means comprising conductors 27 and 28 is provided for connecting the other sides 30, 32 of the windings to the other terminal 34 of said source.

Means for transmitting a voltage transient induced in said first winding W1 upon the cutting off of current flow through the transistor 10, to the second winding W3 for increasing the rate of current rise in this winding comprises a first diode 36 and means including conductors 38 and 40 for connecting diode 36 between said one side 20 of the first winding W1 and the other side 32 of the second winding W3, the diode being oriented to permit the passage of current resulting from said transient through said first winding, said second winding, and said second switching means. A second diode 44 is provided to isolate the power supply from the voltage transient, the second diode being oriented to block the transmission of the transient therethrough to the power supply.

To reduce the peak voltage of transients to a level tolerable by the transistors and diodes, a capacitor 46 is connected between the conductors 18 and 27 and a capacitor 48 is connected between the conductors 24 and 28. These capacitors should be included unless there is enough stray capacitance to effect the aforesaid function. Also desirably in addition, a resistor 50 is connected in series with the conductors 38 and 40 between one side 20 of the first winding and the other side 32 of the second winding to dissipate energy when the supply voltage takes over. Similar means comprising a diode 52 and a resistor 54 are provided for connecting the first side 26 of the second winding and the other side 30 of the first winding.

Figure 9:
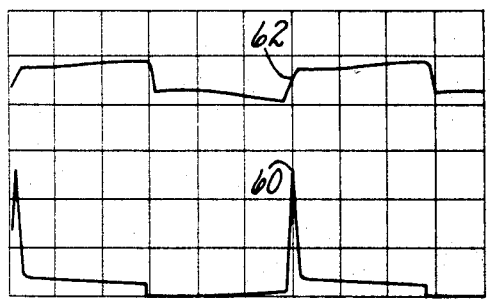
FIG. 9 shows oscilloscope traces of actual winding-current pulses in time relation with collector voltage to illustrate the effect of harnessing voltage transients.

In operation, assume that winding W1, the "first winding," is turned "on" by supplying base current to the driving transistor 14 and that winding W3, the "second winding," is turned "off." If the input to the transistor 14 is brought down to near zero potential, the main switching transistor 10 is turned off resulting in the bypassing of the winding W1 current into the two capacitors 46 and 48 during the first instant. As the voltage goes up on the capacitors the current gradually builds up in winding W3 and at the same time the diode 44 between winding W3 and the power supply is blocked. The current flow from winding W3 and its associated capacitor is down through the transistor 25 connected to winding W3 (since this transistor is turned on at the same time that the transistor 10 is turned off), through the power supply and back to winding W1 through its diode 56. (If the current were merely being transferred to W3, diode 56 could be omitted.) A peak voltage 60 (FIG. 9) across the capacitors is reached when the current 62 in winding W3 has built up to about one-half of its steady value. The energy in winding W1 continues to be absorbed by winding W3 and the capacitors also are discharging energy into this winding during the latter part of the switching period. Eventually the voltage across winding W3 and the capacitors have been reduced to the point where the power supply voltage unblocks the diode 44 in series with winding W3. From this point on the power supply sustains the current in winding W3 at its steady value. During the switching period the windings W1 and W3 together with the two capacitors operate as a parallel LC circuit in which the current in winding W1 is reduced from maximum to zero value while the current in winding 3 is increasing from zero to maximum value. The wave form of the voltage across the capacitors is substantially a half-wave sinusoidal pulse.

For a number of reasons the transfer of stored energy from winding W1 to winding W3 cannot always be accomplished perfectly. By the very nature of the operation of certain stepping motors including the illustrative motor, the windings constitute time-varying inductances whose values depend upon the shaft position. In addition, the winding resistance voltage drops oppose the transfer of energy. Also, the power supply voltage $V_0$ causes the unblocking of the diodes 44 and 56 prior to the complete transfer of the available energy. For these reasons there will be a low residual current in winding W1 at the time the power supply takes over the task of supplying winding W3. The series resistors 50, 54 are inserted in the circuit for the purpose of quickly dissipating this residual energy. However, because of the rapid switching, relatively little energy is lost in these resistors during the switching period.

Having thus described my invention, what I claim as new and desire to secure my Letters Patent of the United States is:

1. A controller for use with electric apparatus having first and second windings for regulating the flow of current from a D.C. source to said windings to provide approximately square wave current pulses sequentially to said first and second windings comprising in combination first and second switching means operable to vary the conductivity of an electric path therethrough, means for connecting said first and second switching means between one side of said first and second windings respectively and one terminal of said D.C. source, means for connecting the other side of the windings to the other terminal of said source, means for controlling the conductivity of said switching means to cause said first switching means to become nonconductive and said second switching means to become conductive and means for transmitting a voltage transient, induced in said first winding upon the cutting off of current flow through said first switching means, to said second winding for increasing the rate of current rise in said second winding comprises a first diode, means for connecting said first diode between said one side of said first winding and said other side of said second winding oriented to permit the passage of current resulting from said transient through said first winding, said second winding, and said second switching means, and a second diode in circuit with the means for connecting said other side of said second winding to the power supply, said second diode being oriented to block the transmission of said voltage transient therethrough to the power supply.

2. Apparatus as in claim 1 and additionally comprising a third diode, means for connecting said third diode in circuit with the means for connecting said other side of said first winding to the power supply, a fourth diode and means for connecting said fourth diode between said one side of the second winding and said other side of said first winding and in which said means for controlling the conductivity of the switching means is operable to effect alternating periods of conductivity of said first and said second switching means.

3. Apparatus as in claim 1 and additionally comprising a capacitor and means for connecting said capacitor across said first winding.

4. Apparatus as in claim 2 and additionally comprising first and second capacitors and means for connecting said capacitors respectively across said first and said second windings.

5. Apparatus as in claim 1 in which said means for connecting said first diode between said first winding and said second winding includes a resistor.

6. Apparatus as in claim 2 and additionally comprising first and second resistors each connected in series with the diodes interconnecting said first and said second windings.

7. Apparatus as in claim 2 and additionally comprising first and second capacitors, means for connecting said capacitors respectively across said first and said second windings, first and second resistors, and means for connecting each resistor in series with the diode interconnecting said first and said second windings.

No references cited.

ORIS L. RADER, *Primary Examiner.*
G. SIMMONS, *Assistant Examiner.*